United States Patent
Natarajan et al.

(10) Patent No.: US 9,294,367 B2
(45) Date of Patent: Mar. 22, 2016

(54) DUPLICATING NETWORK TRAFFIC THROUGH TRANSPARENT VLAN FLOODING

(71) Applicant: Foundry Networks, LLC, San Jose, CA (US)

(72) Inventors: Hari Natarajan, Bangalore (IN); Eskinder Sahle, Arlington, VA (US); Charles Helfinstine, Reston, VA (US); Chris Oskuie, Chantilly, VA (US)

(73) Assignee: Foundry Networks, LLC, San Jose, CA (US)

( * ) Notice: Subject to any disclaimer, the term of this patent is extended or adjusted under 35 U.S.C. 154(b) by 0 days.

(21) Appl. No.: 14/030,782

(22) Filed: Sep. 18, 2013

(65) Prior Publication Data

US 2014/0022916 A1    Jan. 23, 2014

Related U.S. Application Data

(63) Continuation of application No. 11/827,524, filed on Jul. 11, 2007, now Pat. No. 8,615,008.

(51) Int. Cl.
| | |
|---|---|
| *H04L 12/28* | (2006.01) |
| *H04L 12/26* | (2006.01) |
| *H04L 12/933* | (2013.01) |
| *H04L 12/931* | (2013.01) |
| *H04L 12/761* | (2013.01) |
| *H04L 12/46* | (2006.01) |

(52) U.S. Cl.
CPC .......... *H04L 43/026* (2013.01); *H04L 12/4641* (2013.01); *H04L 43/12* (2013.01); *H04L 49/10* (2013.01); *H04L 49/354* (2013.01); *H04L 12/4645* (2013.01); *H04L 45/16* (2013.01)

(58) Field of Classification Search
CPC ..... H04L 49/208; H04L 45/16; H04L 43/026; H04L 49/10
USPC .................. 370/250, 329, 389, 390, 392, 394
See application file for complete search history.

(56) References Cited

U.S. PATENT DOCUMENTS

| | | | |
|---|---|---|---|
| 5,031,094 A | 7/1991 | Toegel et al. | |
| 5,359,593 A | 10/1994 | Derby et al. | |
| 5,948,061 A | 9/1999 | Merriman et al. | |
| 5,951,634 A | 9/1999 | Sitbon et al. | |

(Continued)

FOREIGN PATENT DOCUMENTS

| | | |
|---|---|---|
| EP | 2654340 A1 | 10/2013 |
| IE | 2007/0438 A1 | 2/2008 |
| WO | 2010/135474 A1 | 11/2010 |

OTHER PUBLICATIONS

Non-Final Office Action for U.S. Appl. No. 11/827,524 mailed on Dec. 10, 2009, 15 pages.

(Continued)

*Primary Examiner* — Brian O'Connor
(74) *Attorney, Agent, or Firm* — Kilpatrick Townsend & Stockton LLP

(57) ABSTRACT

An approach to duplicating network traffic is described. In one approach, a method of creating multiple copies of network traffic is detailed. The method involves receiving network traffic, producing a duplicate copy of the network traffic, and forwarding the duplicate copy to a monitoring port. The monitoring port forwards copies to a number of indicated ports.

28 Claims, 14 Drawing Sheets

Flowchart 600

(56) References Cited

U.S. PATENT DOCUMENTS

| | | |
|---|---|---|
| 6,006,269 A | 12/1999 | Phaal |
| 6,006,333 A | 12/1999 | Nielsen |
| 6,092,178 A | 7/2000 | Jindal et al. |
| 6,112,239 A | 8/2000 | Kenner et al. |
| 6,115,752 A | 9/2000 | Chauhan |
| 6,128,279 A | 10/2000 | O'Neil et al. |
| 6,128,642 A | 10/2000 | Doraswamy et al. |
| 6,148,410 A | 11/2000 | Baskey et al. |
| 6,167,445 A | 12/2000 | Gai et al. |
| 6,167,446 A | 12/2000 | Lister et al. |
| 6,182,139 B1 | 1/2001 | Brendel |
| 6,195,691 B1 | 2/2001 | Brown |
| 6,233,604 B1 | 5/2001 | Van Horne et al. |
| 6,286,039 B1 | 9/2001 | Van Horne et al. |
| 6,286,047 B1 | 9/2001 | Ramanathan et al. |
| 6,304,913 B1 | 10/2001 | Rune |
| 6,324,580 B1 | 11/2001 | Jindal et al. |
| 6,327,622 B1 | 12/2001 | Jindal et al. |
| 6,336,137 B1 | 1/2002 | Lee et al. |
| 6,381,627 B1 | 4/2002 | Kwan et al. |
| 6,389,462 B1 | 5/2002 | Cohen et al. |
| 6,427,170 B1 | 7/2002 | Sitaraman et al. |
| 6,434,118 B1 | 8/2002 | Kirschenbaum |
| 6,438,652 B1 | 8/2002 | Jordan et al. |
| 6,446,121 B1 | 9/2002 | Shah et al. |
| 6,449,657 B2 | 9/2002 | Stanbach, Jr. et al. |
| 6,470,389 B1 | 10/2002 | Chung et al. |
| 6,473,802 B2 | 10/2002 | Masters |
| 6,480,508 B1 | 11/2002 | Mwikalo et al. |
| 6,490,624 B1 | 12/2002 | Sampson et al. |
| 6,549,944 B1 | 4/2003 | Weinberg et al. |
| 6,567,377 B1 | 5/2003 | Vepa et al. |
| 6,578,066 B1 | 6/2003 | Logan et al. |
| 6,606,643 B1 | 8/2003 | Emens et al. |
| 6,665,702 B1 | 12/2003 | Zisapel et al. |
| 6,671,275 B1 | 12/2003 | Wong et al. |
| 6,681,232 B1 | 1/2004 | Sitanizadeh et al. |
| 6,681,323 B1 | 1/2004 | Fontsnesi et al. |
| 6,691,165 B1 | 2/2004 | Bruck et al. |
| 6,697,368 B2 | 2/2004 | Chang et al. |
| 6,735,218 B2 | 5/2004 | Chang et al. |
| 6,745,241 B1 | 6/2004 | French et al. |
| 6,751,616 B1 | 6/2004 | Chan |
| 6,772,211 B2 | 8/2004 | Lu et al. |
| 6,779,017 B1 | 8/2004 | Lamberton et al. |
| 6,789,125 B1 | 9/2004 | Aviani et al. |
| 6,826,198 B2 | 11/2004 | Turina et al. |
| 6,831,891 B2 * | 12/2004 | Mansharamani ....... H04L 47/30 370/229 |
| 6,839,700 B2 | 1/2005 | Doyle et al. |
| 6,850,984 B1 | 2/2005 | Kalkunte et al. |
| 6,874,152 B2 | 3/2005 | Vermeire et al. |
| 6,879,995 B1 | 4/2005 | Chinta et al. |
| 6,898,633 B1 | 5/2005 | Lyndersay et al. |
| 6,901,072 B1 | 5/2005 | Wong |
| 6,901,081 B1 | 5/2005 | Ludwig |
| 6,928,485 B1 | 8/2005 | Krishnamurthy et al. |
| 6,944,678 B2 | 9/2005 | Lu et al. |
| 6,963,914 B1 | 11/2005 | Breitbart et al. |
| 6,963,917 B1 | 11/2005 | Callis et al. |
| 6,985,956 B2 | 1/2006 | Luke et al. |
| 6,987,763 B2 | 1/2006 | Rochberger et al. |
| 6,996,615 B1 | 2/2006 | McGuire |
| 6,996,616 B1 | 2/2006 | Leighton et al. |
| 7,000,007 B1 | 2/2006 | Valenti |
| 7,009,968 B2 | 3/2006 | Ambe et al. |
| 7,020,698 B2 | 3/2006 | Andrews et al. |
| 7,020,714 B2 | 3/2006 | Kalyanaraman et al. |
| 7,028,083 B2 | 4/2006 | Levine et al. |
| 7,031,304 B1 | 4/2006 | Arberg et al. |
| 7,032,010 B1 | 4/2006 | Swildens et al. |
| 7,036,039 B2 | 4/2006 | Holland |
| 7,058,717 B2 | 6/2006 | Chao et al. |
| 7,062,642 B1 | 6/2006 | Langrind et al. |
| 7,086,061 B1 | 8/2006 | Joshi et al. |
| 7,089,293 B2 | 8/2006 | Grosner et al. |
| 7,126,910 B1 | 10/2006 | Sridhar |
| 7,127,713 B2 | 10/2006 | Davis et al. |
| 7,136,932 B1 | 11/2006 | Schneider |
| 7,139,242 B2 | 11/2006 | Bays |
| 7,177,933 B2 | 2/2007 | Foth |
| 7,185,052 B2 | 2/2007 | Day |
| 7,187,687 B1 | 3/2007 | Davis et al. |
| 7,188,189 B2 | 3/2007 | Karol et al. |
| 7,197,547 B1 | 3/2007 | Miller et al. |
| 7,206,806 B2 | 4/2007 | Pineau |
| 7,215,637 B1 | 5/2007 | Ferguson et al. |
| 7,225,272 B2 | 5/2007 | Kelley et al. |
| 7,240,015 B1 | 7/2007 | Karmouch et al. |
| 7,240,100 B1 | 7/2007 | Wein et al. |
| 7,254,626 B1 | 8/2007 | Kommula et al. |
| 7,257,642 B1 | 8/2007 | Bridger et al. |
| 7,260,645 B2 | 8/2007 | Bays |
| 7,266,117 B1 | 9/2007 | Davis |
| 7,266,120 B2 * | 9/2007 | Cheng .................... H04L 45/38 370/390 |
| 7,277,954 B1 | 10/2007 | Stewart et al. |
| 7,292,573 B2 | 11/2007 | LaVigne et al. |
| 7,296,088 B1 | 11/2007 | Padmanabhan et al. |
| 7,321,926 B1 | 1/2008 | Zhang et al. |
| 7,424,018 B2 | 9/2008 | Gallatin et al. |
| 7,436,832 B2 | 10/2008 | Gallatin et al. |
| 7,440,467 B2 | 10/2008 | Gallatin et al. |
| 7,450,527 B2 * | 11/2008 | Ashwood Smith ...... H04L 12/18 370/255 |
| 7,454,500 B1 | 11/2008 | Hsu et al. |
| 7,483,374 B2 | 1/2009 | Nilakantan et al. |
| 7,506,065 B2 | 3/2009 | LaVigne et al. |
| 7,555,562 B2 | 6/2009 | See et al. |
| 7,587,487 B1 | 9/2009 | Gunturu |
| 7,606,203 B1 | 10/2009 | Shabtay et al. |
| 7,690,040 B2 | 3/2010 | Frattura et al. |
| 7,706,363 B1 | 4/2010 | Daniel et al. |
| 7,720,066 B2 * | 5/2010 | Weyman ................ H04L 45/04 370/390 |
| 7,720,076 B2 * | 5/2010 | Dobbins ............. H04L 12/1886 370/395.52 |
| 7,747,737 B1 | 6/2010 | Apte et al. |
| 7,787,454 B1 | 8/2010 | Won et al. |
| 7,792,047 B2 | 9/2010 | Gallatin et al. |
| 7,835,358 B2 | 11/2010 | Gallatin et al. |
| 7,848,326 B1 | 12/2010 | Leong et al. |
| 7,889,748 B1 | 2/2011 | Leong et al. |
| 7,940,766 B2 * | 5/2011 | Olakangil ........... H04L 12/1836 370/390 |
| 7,953,089 B1 * | 5/2011 | Ramakrishnan .... H04L 12/4641 370/392 |
| 8,208,494 B2 | 6/2012 | Leong |
| 8,238,344 B1 * | 8/2012 | Chen ..................... H04L 45/16 370/235 |
| 8,239,960 B2 | 8/2012 | Frattura et al. |
| 8,248,928 B1 | 8/2012 | Wang et al. |
| 8,270,845 B2 | 9/2012 | Cheung et al. |
| 8,315,256 B2 | 11/2012 | Leong et al. |
| 8,386,846 B2 | 2/2013 | Cheung |
| 8,391,286 B2 | 3/2013 | Gallatin et al. |
| 8,514,718 B2 * | 8/2013 | Zijst .............................. 370/238 |
| 8,537,697 B2 | 9/2013 | Leong et al. |
| 8,570,862 B1 | 10/2013 | Leong et al. |
| 8,615,008 B2 | 12/2013 | Natarajan et al. |
| 8,654,651 B2 | 2/2014 | Leong et al. |
| 8,824,466 B2 | 9/2014 | Won et al. |
| 8,830,819 B2 | 9/2014 | Leong et al. |
| 8,873,557 B2 | 10/2014 | Nguyen |
| 8,891,527 B2 | 11/2014 | Wang |
| 8,897,138 B2 | 11/2014 | Yu et al. |
| 8,953,458 B2 | 2/2015 | Leong et al. |
| 2001/0049741 A1 | 12/2001 | Skene et al. |
| 2001/0052016 A1 | 12/2001 | Skene et al. |
| 2002/0018796 A1 | 2/2002 | Wironen |
| 2002/0023089 A1 | 2/2002 | Woo |
| 2002/0026551 A1 | 2/2002 | Kamimaki et al. |
| 2002/0038360 A1 | 3/2002 | Andrews et al. |
| 2002/0055939 A1 | 5/2002 | Nardone et al. |

(56) References Cited

U.S. PATENT DOCUMENTS

| | | |
|---|---|---|
| 2002/0059170 A1 | 5/2002 | Vange |
| 2002/0059464 A1 | 5/2002 | Hata et al. |
| 2002/0062372 A1 | 5/2002 | Hong et al. |
| 2002/0078233 A1 | 6/2002 | Biliris et al. |
| 2002/0091840 A1 | 7/2002 | Pulier et al. |
| 2002/0112036 A1 | 8/2002 | Bohannan et al. |
| 2002/0120743 A1 | 8/2002 | Shabtay et al. |
| 2002/0124096 A1 | 9/2002 | Loguinov et al. |
| 2002/0133601 A1 | 9/2002 | Kennamer et al. |
| 2002/0150048 A1 | 10/2002 | Ha et al. |
| 2002/0154600 A1 | 10/2002 | Ido et al. |
| 2002/0188862 A1 | 12/2002 | Trethewey et al. |
| 2002/0194324 A1 | 12/2002 | Guha |
| 2002/0194335 A1 | 12/2002 | Maynard |
| 2003/0031185 A1 | 2/2003 | Kikuchi et al. |
| 2003/0035430 A1 | 2/2003 | Islam et al. |
| 2003/0065711 A1 | 4/2003 | Acharya et al. |
| 2003/0065763 A1 | 4/2003 | Swildens et al. |
| 2003/0105797 A1 | 6/2003 | Dolev et al. |
| 2003/0115283 A1 | 6/2003 | Barbir et al. |
| 2003/0135509 A1 | 7/2003 | Davis et al. |
| 2003/0202511 A1 | 10/2003 | Sreejith et al. |
| 2003/0210686 A1 | 11/2003 | Terrell et al. |
| 2003/0210694 A1 | 11/2003 | Jayaraman et al. |
| 2003/0229697 A1 | 12/2003 | Borella |
| 2004/0019680 A1 | 1/2004 | Chao et al. |
| 2004/0024872 A1 | 2/2004 | Kelley et al. |
| 2004/0032868 A1 | 2/2004 | Oda |
| 2004/0064577 A1 | 4/2004 | Dahlin et al. |
| 2004/0194102 A1 | 9/2004 | Neerdaels |
| 2004/0249939 A1 | 12/2004 | Amini et al. |
| 2004/0249971 A1 | 12/2004 | Klinker |
| 2005/0021883 A1 | 1/2005 | Shishizuka et al. |
| 2005/0033858 A1 | 2/2005 | Swildens et al. |
| 2005/0060418 A1 | 3/2005 | Sorokopud |
| 2005/0060427 A1 | 3/2005 | Phillips et al. |
| 2005/0086295 A1 | 4/2005 | Cunningham et al. |
| 2005/0149531 A1 | 7/2005 | Srivastava |
| 2005/0169180 A1 | 8/2005 | Ludwig |
| 2005/0190695 A1 | 9/2005 | Phaal |
| 2005/0207417 A1 | 9/2005 | Ogawa et al. |
| 2005/0286416 A1 | 12/2005 | Shimonishi et al. |
| 2006/0036743 A1 | 2/2006 | Deng et al. |
| 2006/0039374 A1 | 2/2006 | Belz et al. |
| 2006/0045082 A1 | 3/2006 | Fertell et al. |
| 2006/0143300 A1 | 6/2006 | See et al. |
| 2007/0053296 A1 | 3/2007 | Yazaki et al. |
| 2007/0195761 A1 | 8/2007 | Tatar et al. |
| 2007/0233891 A1 | 10/2007 | Luby et al. |
| 2008/0002591 A1 | 1/2008 | Ueno |
| 2008/0031141 A1 | 2/2008 | Lean et al. |
| 2008/0159141 A1 | 7/2008 | Soukup et al. |
| 2008/0195731 A1 | 8/2008 | Harmel et al. |
| 2008/0304423 A1 | 12/2008 | Chuang et al. |
| 2009/0135835 A1 | 5/2009 | Gallatin et al. |
| 2009/0262745 A1 | 10/2009 | Leong et al. |
| 2010/0135323 A1 | 6/2010 | Leong |
| 2010/0209047 A1 | 8/2010 | Cheung et al. |
| 2010/0325178 A1 | 12/2010 | Won et al. |
| 2011/0044349 A1 | 2/2011 | Gallatin et al. |
| 2011/0058566 A1 | 3/2011 | Leong et al. |
| 2011/0211443 A1 | 9/2011 | Leong et al. |
| 2011/0216771 A1 | 9/2011 | Gallatin et al. |
| 2012/0023340 A1 | 1/2012 | Cheung |
| 2012/0157088 A1 | 6/2012 | Gerber et al. |
| 2012/0243533 A1 | 9/2012 | Leong |
| 2012/0257635 A1 | 10/2012 | Gallatin et al. |
| 2013/0010613 A1 | 1/2013 | Cafarelli et al. |
| 2013/0034107 A1 | 2/2013 | Leong et al. |
| 2013/0156029 A1 | 6/2013 | Gallatin et al. |
| 2013/0173784 A1 | 7/2013 | Wang et al. |
| 2013/0201984 A1 | 8/2013 | Wang |
| 2013/0272135 A1 | 10/2013 | Leong |
| 2014/0016500 A1 | 1/2014 | Leong et al. |
| 2014/0029451 A1 | 1/2014 | Nguyen |
| 2014/0204747 A1 | 7/2014 | Yu et al. |
| 2014/0321278 A1 | 10/2014 | Cafarelli et al. |
| 2015/0180802 A1 | 6/2015 | Chen et al. |

OTHER PUBLICATIONS

Non-Final Office Action for U.S. Appl. No. 11/827,524 mailed on Jun. 2, 2010, 14 pages.
Non-Final Office Action for U.S. Appl. No. 11/827,524 mailed on Nov. 26, 2010, 16 pages.
Final Office Action for U.S. Appl. No. 11/827,524 mailed on May 6, 2011, 19 pages.
Advisory Action for U.S. Appl. No. 11/827,524 mailed on Jul. 14, 2011, 5 pages.
Non-Final Office Action for U.S. Appl. No. 11/827,524 mailed on Oct. 18, 2012, 24 pages.
Notice of Allowance for U.S. Appl. No. 11/827,524 mailed Jun. 25, 2013, 11 pages.
U.S. Appl. No. 61/919,244, filed Dec. 20, 2013 by Chen et al.
U.S. Appl. No. 61/932,650, filed Jan. 28, 2014 by Munshi et al.
U.S. Appl. No. 61/994,693, filed May 16, 2014 by Munshi et al.
U.S. Appl. No. 62/088,434, filed Dec. 5, 2014 by Hsu et al.
U.S. Appl. No. 62/137,073, filed Mar. 23, 2015 by Chen et al.
U.S. Appl. No. 62/137,084, filed Mar. 23, 2015 by Chen et al.
U.S. Appl. No. 62/137,096, filed Mar. 23, 2015 by Laxman et al.
U.S. Appl. No. 62/137,106, filed Mar. 23, 2015 by Laxman et al.
U.S. Appl. No. 60/998,410, filed Oct. 9, 2007 by Wang et al.
PCT Patent Application No. PCT/US2015/012915 filed on Jan. 26, 2015 by Hsu et al.
Brocade and IBM Real-Time Network Analysis Solution; 2011 Brocade Communications Systems, Inc.; 2 pages.
Brocade IP Network Leadership Technology; Enabling Non-Stop Networking for Stackable Switches with Hitless Failover; 2010; 3 pages.
Gigamon Adaptive Packet Filtering; Feature Brief; 3098-03 Apr. 2015; 3 pages.
Gigamon: Active Visibility for Multi-Tiered Security Solutions Overview; 3127-02; Oct. 2014; 5 pages.
Gigamon: Application Note Stateful GTP Correlation; 4025-02; Dec. 2013; 9 pages.
Gigamon: Enabling Network Monitoring at 40Gbps and 100Gbps with Flow Mapping Technology White Paper; 2012; 4 pages.
Gigamon: Enterprise System Reference Architecture for the Visibility Fabric White Paper; 5005-03; Oct. 2014; 13 pages.
Gigamon: Gigamon Intelligent Flow Mapping White Paper; 3039-02; Aug. 2013; 7 pages.
Gigamon: GigaVUE-HB1 Data Sheet; 4011-07; Oct. 2014; 4 pages.
Gigamon: Maintaining 3G and 4G LTE Quality of Service White Paper; 2012; 4 pages.
Gigamon: Monitoring, Managing, and Securing SDN Deployments White Paper; 3106-01; May 2015; 7 pages.
Gigamon: Netflow Generation Feature Brief; 3099-04; Oct. 2014; 2 pages.
Gigamon: Service Provider System Reference Architecture for the Visibility Fabric White Paper; 5004-01; Mar. 2014; 11 pages.
Gigamon: The Visibility Fabric Architecture—A New Approach to Traffic Visibility White Paper; 2012-2013; 8 pages.
Gigamon: Unified Visibility Fabric—A New Approach to Visibility White Paper; 3072-04; Jan. 2015; 6 pages.
Gigamon: Unified Visibility Fabric Solution Brief; 3018-03; Jan. 2015; 4 pages.
Gigamon: Unified Visibility Fabric; https://www.gigamon.com/unfied-visibility-fabric; Apr. 7, 2015; 5 pages.
Gigamon: Visibility Fabric Architecture Solution Brief; 2012-2013; 2 pages.
Gigamon: Visibility Fabric; More than Tap and Aggregation.bmp; 2014; 1 page.
Gigamon: Vistapointe Technology Solution Brief; Visualize-Optimize-Monetize-3100-02; Feb. 2014; 2 pages.
IBM User Guide, Version 2.1AIX, Solaris and Windows NT, Third Edition (Mar. 1999) 102 Pages.
International Search Report & Written Opinion for PCT Application PCT/US2015/012915 mailed Apr. 10, 2015, 15 pages.

(56) References Cited

OTHER PUBLICATIONS

Ixia Anue GTP Session Controller; Solution Brief; 915-6606-01 Rev. A, Sep. 2013; 2 pages.
Ixia: Creating a Visibility Architecture—a New Perspective on Network Visibilty White Paper; 915-6581-01 Rev. A, Feb. 2014; 14 pages.
Netscout: nGenius Subscriber Intelligence; Data Sheet; SPDS_001-12; 2012; 6 pages.
Netscout; Comprehensive Core-to-Access IP Session Analysis for GPRS and UMTS Networks; Technical Brief; Jul. 16, 2010; 6 pages.
ntop: Monitoring Mobile Networks (2G, 3G and LTE) using nProbe; http://www.ntop.org/nprobe/monitoring-mobile-networks-2g-3g-and-lte-using-nprobe; Apr. 2, 2015; 4 pages.
White Paper, Foundry Networks, "Server Load Balancing in Today's Web-Enabled Enterprises" Apr. 2002 10 Pages.
Non-Final Office Action for U.S. Appl. No. 13/584,534 mailed on Oct. 24, 2014, 24 pages.
Restriction Requirement for U.S. Appl. No. 13/584,534 mailed on Jul. 21, 2014, 5 pages.
Non-Final Office Action for U.S. Appl. No. 11/937,285 mailed on Jul. 6, 2009, 28 pages.
Final Office Action for U.S. Appl. No. 11/937,285 mailed on Mar. 3, 2010, 28 pages.
Non-Final Office Action for U.S. Appl. No. 11/937,285 mailed on Aug. 17, 2010, 28 pages.
Final Office Action for U.S. Appl. No. 11/937,285 mailed on Jan. 20, 2011, 41 pages.
Final Office Action for U.S. Appl. No. 11/937,285 mailed on May 20, 2011, 37 pages.
Non-Final Office Action for U.S. Appl. No. 11/937,285 mailed on Nov. 28, 2011, 40 pages.
Notice of Allowance for U.S. Appl. No. 11/937,285 mailed on Jun. 5, 2012, 10 pages.
Non-Final Office Action for U.S. Appl. No. 14/320,138, mailed Feb. 2, 2016, 13 pages.

* cited by examiner

Network Device 200

Exemplary Switch 300
(Port Mirroring)

Exemplary VLAN 350
(VLAN Flooding)

Flowchart 400

Network Device 500

Network Device 500

Flowchart 700

Flowchart 800

DUPLICATING NETWORK TRAFFIC THROUGH TRANSPARENT VLAN FLOODING

CROSS REFERENCE TO RELATED APPLICATIONS

This Continuation application claims the benefit of the commonly-owned U.S. patent application Ser. No. 11/827,524, filed on Jul. 11, 2007, by Natarajan, et. al., now U.S. Pat. No. 8,615,008 issued Dec. 13, 2013, and titled "Duplicating Network Traffic through Transparent VLAN Flooding", and hereby incorporated by reference in its entirety.

BACKGROUND

There is a growing need, in the field of computer networks, to be able to monitor network traffic. A combination of government regulations, quality assurance responsibilities, and competitive necessities has resulted in an industry-wide need to be able to monitor traffic passing through a network. The level or type of monitoring may vary, depending upon the particular task being performed. For example, it might be desirable to monitor all traffic between a specific source and a specific destination, or to gather information about all traffic passing across the network that involves a specific protocol.

Unfortunately, the tools available to network administrators to perform this kind of monitoring are extremely limited. Many layer 2 devices offer a limited "port mirroring" option, which can create a single copy of traffic coming in on a single port, and output that copy to a single destination port. Port mirroring, used in this fashion, does not offer the ability to make multiple copies, e.g., for multiple different monitoring roles, nor does it allow for sending the copied traffic to different destinations.

Alternatively, a physical "tap" can be inserted in-line, and a portion of the signal can be physically diverted. This approach raises issues involving signal degradation, however; moreover, the equipment used in this approach can be extremely expensive.

Some vendors supply a limited software solution, which creates a set number of copies of traffic. However, software solutions are not scalable, particularly at the speed involved in modern network connections. Also, these approaches only create a limited number of copies of the traffic.

SUMMARY

An approach to duplicating network traffic is described. In one approach, a method of creating multiple copies of network traffic is detailed. The method involves receiving network traffic, producing a duplicate copy of the network traffic, and forwarding the duplicate copy to a monitoring port. The monitoring port forwards copies to a number of ports.

Another approach is provided, in which a network device is described. The network device includes a number of networking ports for receiving and transmitting data, and a switching fabric for routing network traffic between networking ports. The networking ports also include an input port, which is used to receive network traffic and is configured to create a duplicate copy of the network traffic. The networking ports also include a monitoring input port, coupled to the input port, which receives a duplicate copy, and is configured to create additional copies and forward them to a number of monitoring ports.

Another described approach details a computer usable medium having computer readable program code embodied therein for causing a computer system to execute a method of monitoring network traffic on a network device. This approach includes receiving the network traffic into an input port. The network traffic is duplicated, producing duplicate traffic. This duplicate traffic is diverted to a monitoring virtual local area network (VLAN), where it is received by a monitoring input port, which forwards a copy of this duplicate traffic to each available port in the VLAN.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
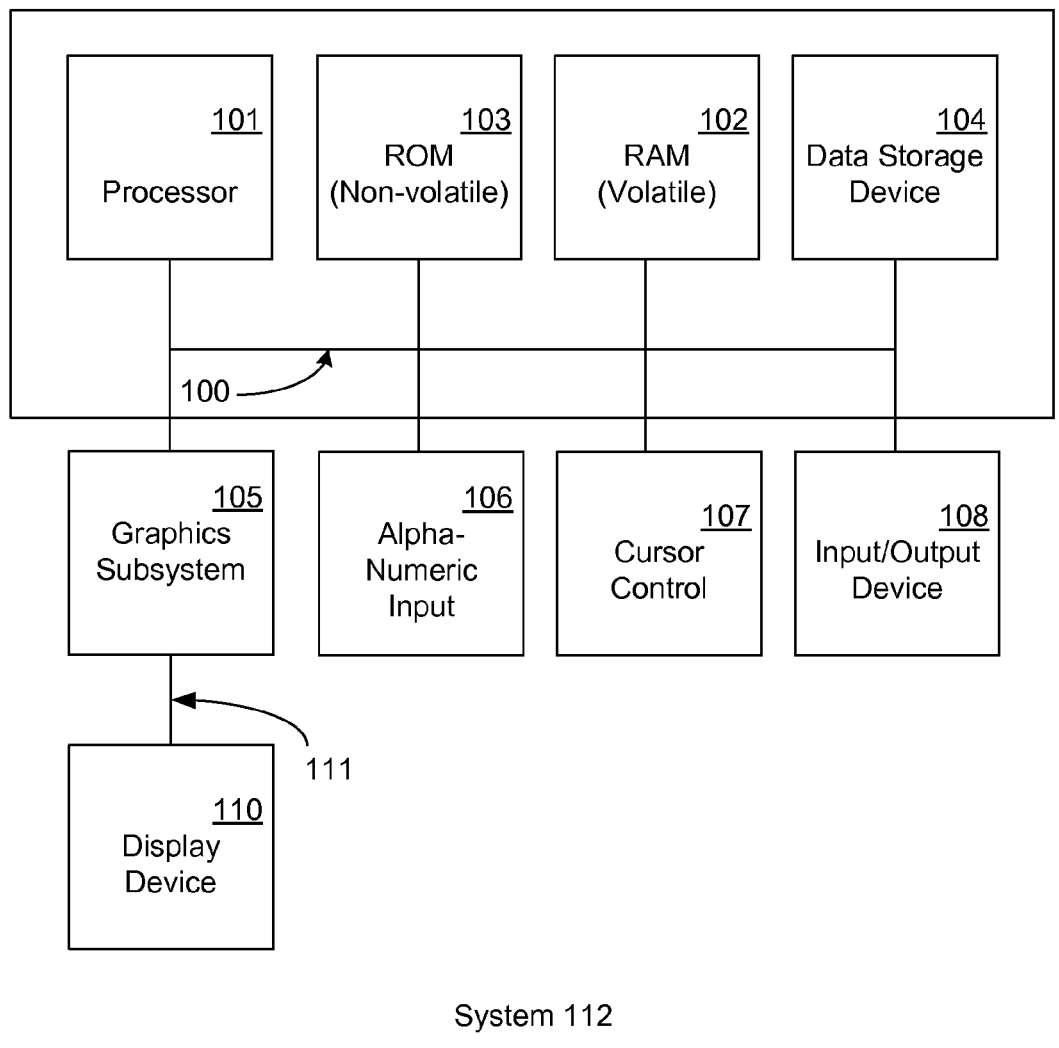
FIG. 1 is a block diagram of an exemplary computer system upon which embodiments of the present invention may be implemented.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternatives, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIG. 4) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed in computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as computing system 112, typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.
Network Traffic Duplication Via Transparent VLAN Flooding In the following embodiments, an approach is described for creating an arbitrary number of copies of network traffic, and dispatching them to arbitrary destinations. This approach takes network traffic from any given network port, transparently duplicates it, and forwards the copies to an arbitrary number of network ports. One embodiment involves using port mirroring to create a copy of the selected network traffic. This copy is sent to an input port for a VLAN. By disabling MAC learning for the input port, the traffic is duplicated across the entire VLAN, by means of VLAN flooding. By adjusting VLAN membership, different numbers of copies of the traffic can be created, and dispatched to different ports in the switch. Moreover, different types of traffic can be subjected to different types of monitoring, through the application of network traffic management rules.

Figure 2:
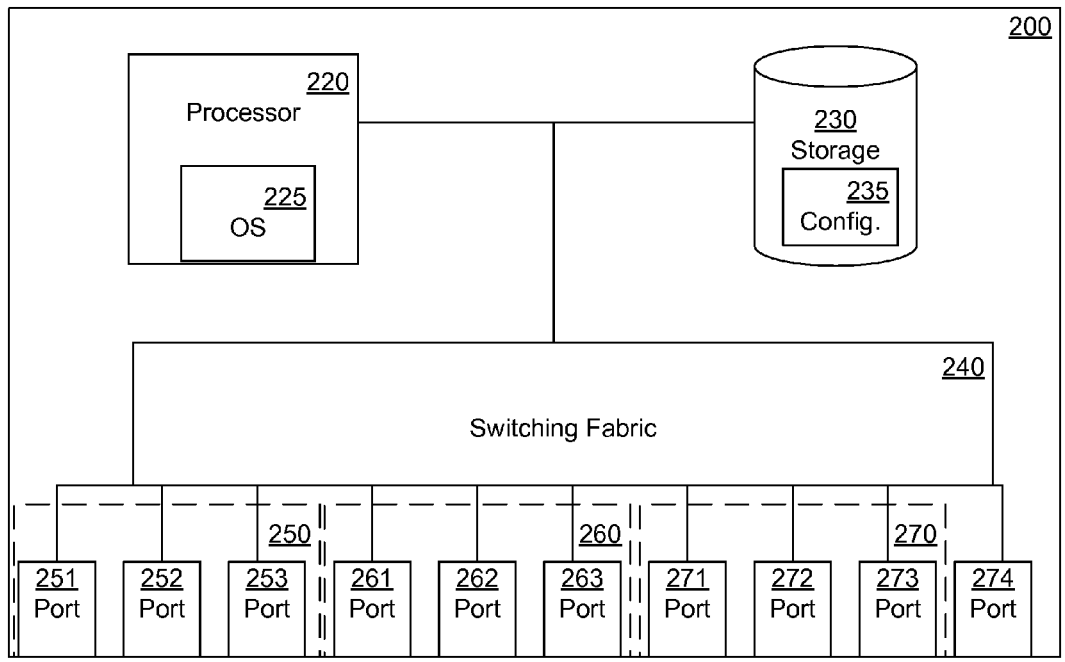
FIG. 2 is a block diagram of an exemplary network device, in accordance with one embodiment.

In another described embodiment, a layer 2 device, such as a switch, can be configured to enable network traffic monitoring for network traffic passing through the device. In this embodiment, the type of traffic to be monitored, as well as the number of copies to be made and the destinations for those copies, can be adjusted. In such embodiments, if an additional monitoring device needs to be added to the network, it is simply connected to the layer 2 device, and the appropriate port is added to the monitoring VLAN. Further functionality of the layer 2 device may be customized through the use of other networking rules, to provide a scalable, flexible, and robust solution to the need for network monitoring.
Exemplary Networking Device With reference now to FIG. 2, a block diagram of an exemplary network device 200 is depicted, in accordance with one embodiment. While network device 200 is shown as incorporating specific, enumerated features, it is understood that embodiments are well suited to applications involving additional, fewer, or different features or arrangements. Moreover, while network device 200, as shown, is a layer 2 device, it is understood that embodiments may be practiced on many different types of devices, e.g., a layer 2/3 device.

As shown, network device 200 includes processor 220, storage 230, switching fabric 240, and a number of communications ports, e.g., ports 251, 252, 253, 261, 262, 263, 271, 272, 273, and 274. Processor 220 executes instructions for controlling network device 200, and for managing traffic passing through network device 200. An operating system 225 is shown as executing on processor 220; in some embodiments, operating system 225 supplies the programmatic interface to network device 200.

Network device 200 is also shown as including storage 230. In different embodiments, different types of storage may be utilized, as well as differing amounts of storage. For example, in some embodiments, storage 230 may consist of flash memory, magnetic storage media, or any other appropriate storage type, or combinations thereof. In some embodiments, storage 230 is used to store operating system 225, which is loaded into processor 220 when network device 200 is initialized. Additionally, as shown, storage 230 contains configuration 235. Configuration 235 provides instructions for operating system 225 on how network device 200 is to be operated.

Network device 200 also includes switching fabric 240. In the depicted embodiment, switching fabric 240 is the hardware, software, or combination thereof that passes traffic between a source and a destination. Switching fabric 240, as shown, includes the packet processors, application-specific integrated circuits (ASICs), field programmable gate arrays (FPGAs), and/or controlling programming used to analyze network traffic, apply appropriate networking rules, and route data between ports in network device 200. In many of the embodiments described herein, it is understood that configuring or instructing a port to perform an action involves configuring or instructing that portion of the switching fabric that controls the indicated port to perform that action. For example, if port 251 is configured to implement port mirroring, the packet processor in switching fabric 240 responsible for controlling port 251 is so configured.

Network device 200 is shown as incorporating a number of communications ports. In the depicted device, these communications ports can be arbitrarily assigned to different virtual local area networks (VLANs), according to the instructions contained in configuration 235. Several exemplary VLANs are depicted, namely VLANs 250, 260, and 270. VLAN membership is configurable, and a single physical port may belong to multiple virtual LANs. Network device 200 receives network traffic from attached devices, e.g., computers, or other networking devices, and passes it to its intended destination by means of these communications ports.

Port Mirroring

One feature common to many layer 2 devices is port mirroring. Port mirroring allows traffic being received on one port to be duplicated, and the copy forwarded to a designated second port. Meanwhile, the original traffic is passed on to its intended destination, without further interference. While port mirroring, by itself, is an insufficient solution to the need for network traffic monitoring, embodiments described below make use of port mirroring in order to generate an initial copy of network traffic.

Figure 3A:
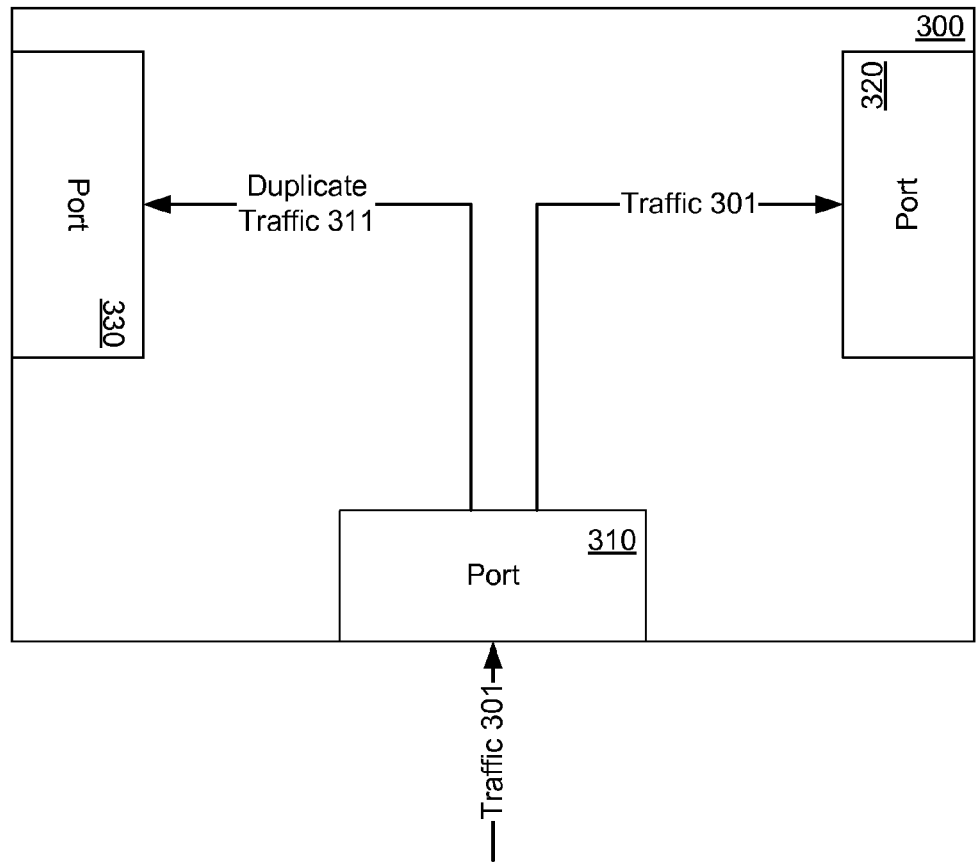
FIG. 3A is an exemplary switch, in accordance with one embodiment.

With reference to FIG. 3A, an exemplary switch 300 is depicted, showing the functionality of port mirroring. While exemplary switch 300 is shown as containing specific, enumerated features, it is understood that embodiments are well suited to applications involving fewer, additional, or different features and arrangements.

Exemplary switch 300 is shown as receiving some network traffic 301 via port 310. In the depicted embodiment, port 310 is configured to utilize port mirroring, by passing the original traffic through to one port, e.g., port 320, and creating a duplicate of the traffic and passing it to a second port, e.g., port 330. As depicted, network traffic 301 is passed through port 310 to port 320, for delivery to its intended destination. Meanwhile, port 310 creates duplicate network traffic 311, and passes duplicate network traffic 311 to port 330, e.g., for monitoring purposes.

MAC Learning and VLAN Flooding

Media Access Control (MAC) address learning, or MAC learning, is a means by which a receiving port in a layer 2 device "learns" how to reach various destinations. In one approach, the source MAC address of every packet received by the port is stored, such that the port will recognize future packets intended for a known recipient, and forward those packets to the appropriate connection.

When a packet with an unknown destination is received, the port will forward that packet to all available connections, thereby "flooding" the network with copies of that packet. This behavior can be modified, e.g., by limiting flooding to ports in the same VLAN as the receiving port. The combination of MAC learning and VLAN flooding helps to minimize traffic on the network, by only utilizing flooding where the destination of a particular packets is not known.

Figure 3B:
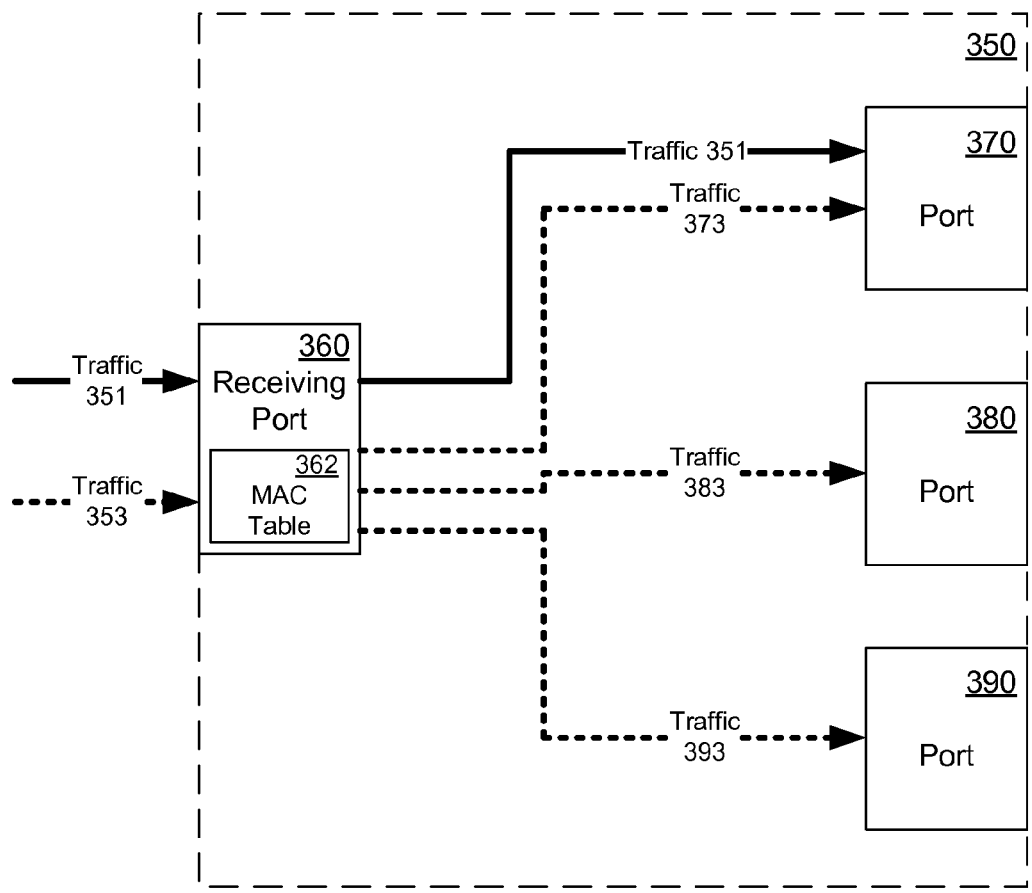
FIG. 3B is an exemplary VLAN, in accordance with one embodiment.

With reference to FIG. 3B, an exemplary VLAN 350 is depicted, in accordance with one embodiment. In the depicted embodiment, MAC learning has been implemented for VLAN 350, such that traffic with known destinations will be passed through VLAN 350 efficiently, while traffic with unknown destinations will be flooded across all available ports.

VLAN 350 is shown as including ports 360, 370, 380, and 390. In the depicted embodiment, port 360 is a receiving port, and receives network traffic 351 and network traffic 353. When determining how to route received network traffic, receiving port 360 compares the destination of the network traffic with MAC address table 362, to determine if the intended destination is known. In the depicted embodiment, network traffic 351 corresponds to a known destination in MAC address table 362, and is routed to port 370. Network traffic 353, however, does not have a known destination. Accordingly, port 360 floods VLAN 350 with copies of network traffic 353; copies 373, 383, and 393 are sent to every other available port in VLAN 350.

Method of Duplicating Network Traffic

Figure 4:
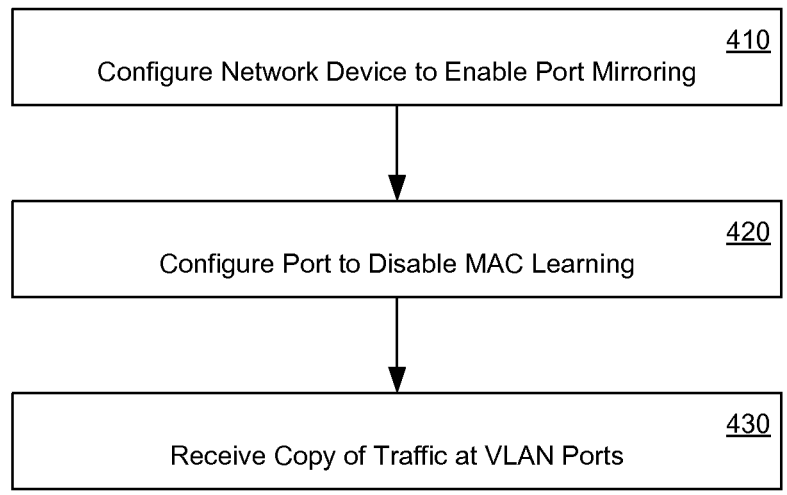
FIG. 4 is a flowchart of a method of duplicating network traffic, in accordance with one embodiment.

With reference now to FIG. 4, a flowchart 400 of a method of duplicating network traffic is depicted, in accordance with one embodiment. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference to step 410, a network device is configured to enable port mirroring. In some embodiments, port mirroring is used to create a duplicate copy of network traffic, without impacting the original traffic. This duplicate traffic can be forwarded to a receiving port, while the original is passed through the network device to its intended destination. Here, the duplicate traffic is forwarded to another port in the network device. In this embodiment, this port is part of a defined "monitoring" VLAN; the other ports in the monitoring VLAN are used to communicate with various monitoring devices. If additional monitoring devices are desired, other ports may be added to the monitoring VLAN, and those devices connected to the new ports.

With reference to step 420, the receiving port is configured to disable MAC learning. By disabling MAC learning for the receiving port, VLAN traffic received at that port will be flooded to every other port in the same VLAN.

With reference now to step 430, a copy of the network traffic is received at every port in the monitoring VLAN. In this way, this embodiment allows for an arbitrary number of copies of network traffic to be generated, and dispatched to arbitrary ports in a network device. The described approach does not require additional expense of hardware to be placed in-line with the network, and provides a scalable approach to the problems of network monitoring.

Monitoring Traffic in a Network Device

Figure 5A:
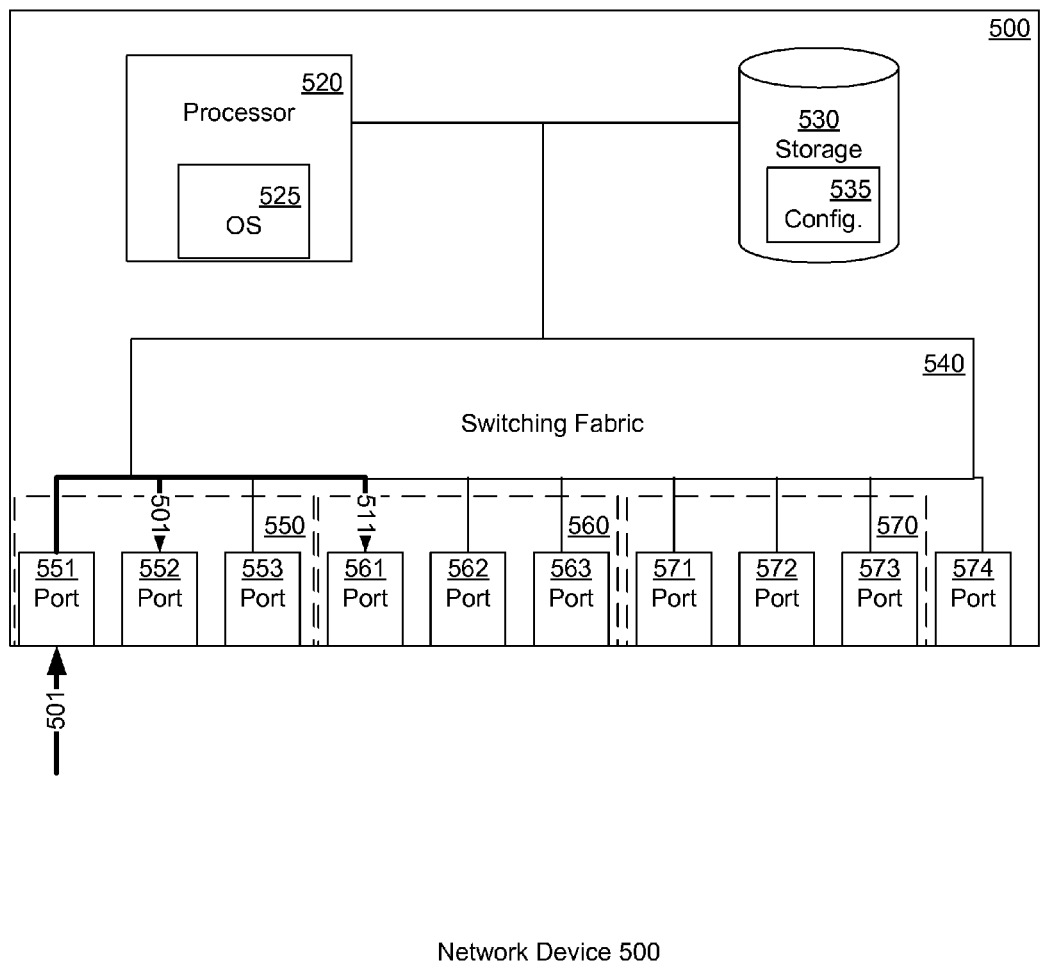
FIG. 5A is a depiction of the flow of network traffic through an exemplary network device, in accordance with one embodiment.
Figure 5B:
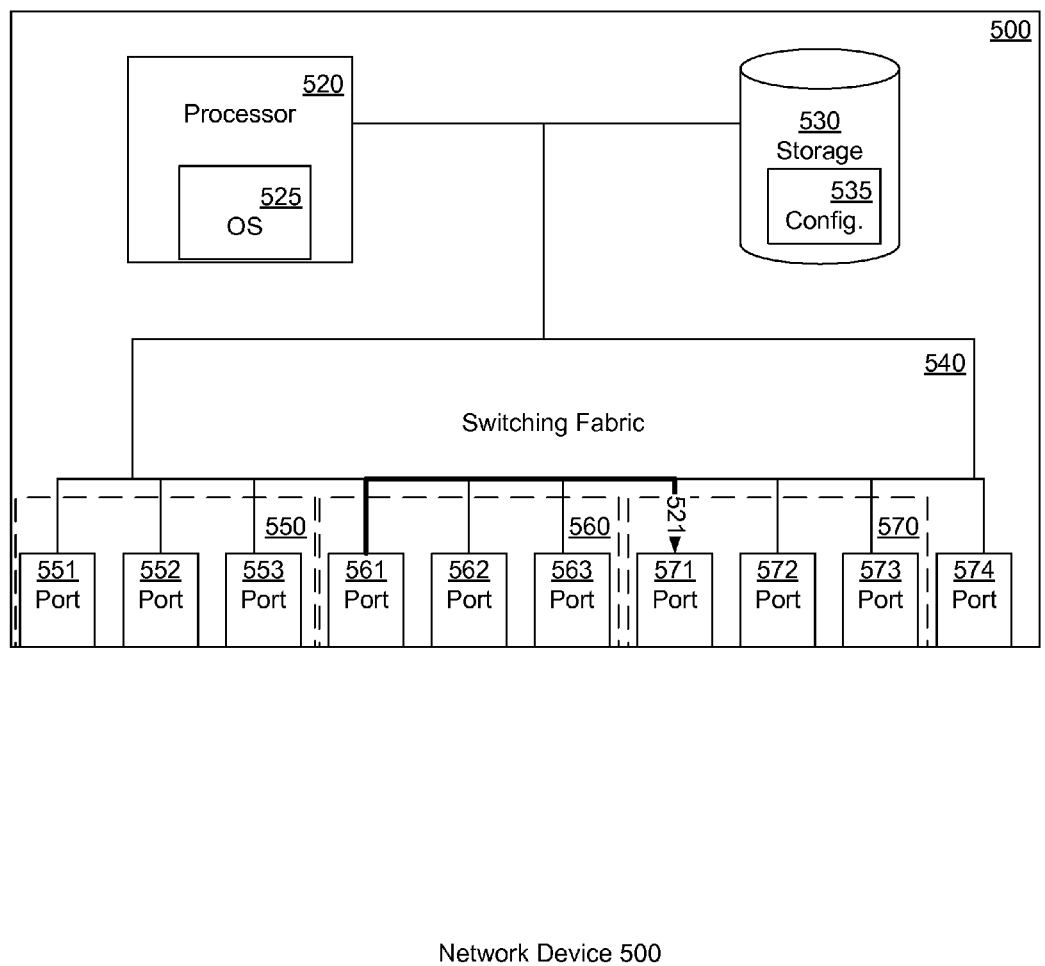
FIG. 5B is a depiction of the flow of network traffic through an exemplary network device, in accordance with one embodiment.
Figure 5C:
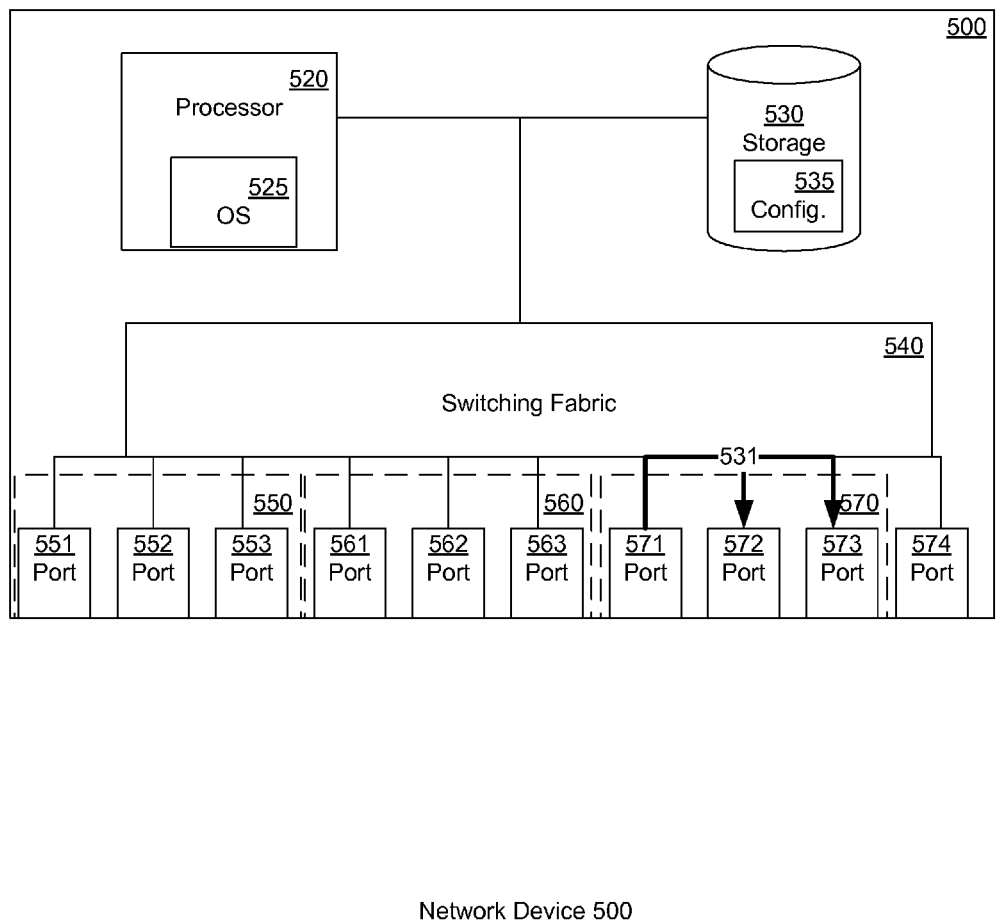
FIG. 5C is a depiction of the flow of network traffic through an exemplary network device, in accordance with one embodiment.

With reference now to FIGS. 5A through 5C, the flow of network traffic through a network device 500 is depicted, in accordance with one embodiment. While network device 500 is shown as incorporating specific, enumerated features, it is understood that embodiments are well suited to applications involving additional, fewer, or different features or arrangements. Moreover, while network device 500, as shown, is a layer 2 device, it is understood that embodiments may be practiced on many different types of devices, e.g., a layer 2/3 device.

As shown, network device 500 includes processor 520, storage 530, switching fabric 540, and a number of communications ports, e.g., ports 551, 552, 553, 561, 562, 563, 571, 572, 573, and 574. An operating system 525 is shown as executing on processor 520. A configuration 535 is shown as being stored within storage 530.

Figure 6:
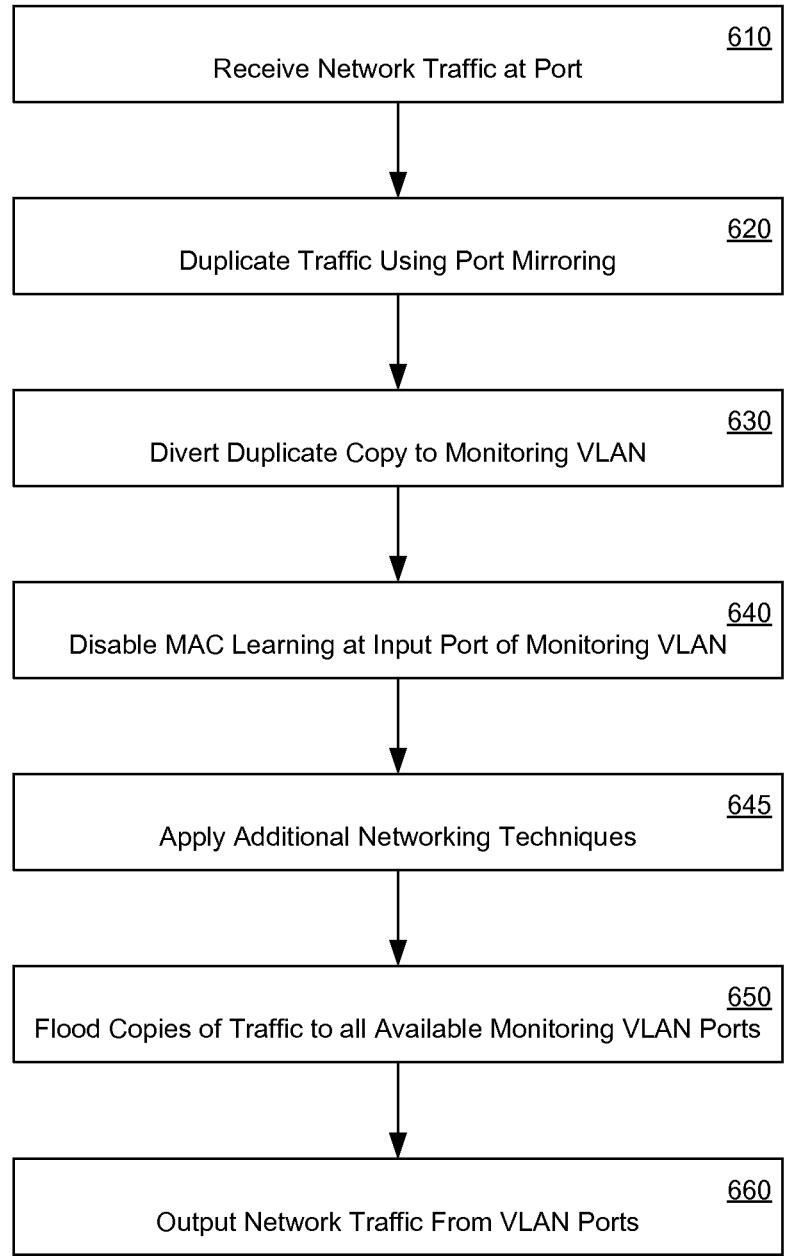
FIG. 6 is a flowchart of a method of monitoring traffic on a network device, in accordance with one embodiment.

With reference now to FIG. 6, a flowchart 600 of a method of monitoring traffic on a network device is depicted, in accordance with one embodiment. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

With reference now to step 610, network traffic is received by a port in the network device. In the depicted embodiment, the received traffic is identified as traffic to be monitored. In different embodiments, this determination can be performed in different ways. For example, traffic may be identified as of interest if it is intended for a specified recipient, originates from a specified sender, conforms to a particular protocol, is intended for a specified VLAN, or any combination of these elements, or any other identifier of interest.

For example, with reference to FIGS. 5A through 5C, will be port 551 receives network traffic 501, which is identified as traffic to be monitored.

With reference now to step 620, the network device uses port mirroring to create a duplicate copy of the network traffic to be monitored. In some embodiments, the original traffic is allowed to pass through the network device uninterrupted. In some embodiments, network devices, such as layer 2 devices, can be configured to "mirror" traffic; a duplicate copy of the traffic is created, while the original traffic passes through the network device unhindered. The duplicate copy of the traffic can be routed to another port in the network device.

In different embodiments, different approaches may be utilized to initiate and configure port mirroring. For example, in one embodiment, configuration 535 includes appropriate commandline interface (CLI) commands to instruct OS 525 to configure port 551 (or a portion of switching fabric 540 associated with port 551) to implement port mirroring.

Continuing the above example, port 551 is configured to use port mirroring create a duplicate copy of traffic 501, duplicate 511. Network traffic 501 is routed by switching fabric 540 through network device 502 to the appropriate port, e.g., port 552, for delivery to its intended destination. Duplicate 511, meanwhile, is routed to another port, e.g., port 561.

With reference now to step 630, the duplicate copy of the network traffic is diverted to a monitoring VLAN. In some embodiments, several ports in the network device may be associated with a particular VLAN. As explained in greater detail, below, associating the various ports used for monitoring traffic into a VLAN offers some advantages, in terms of flexibility and extensibility of the monitoring system.

Continuing the preceding example, port 561 routes duplicate traffic 511 to VLAN 570, as indicated by arrow 521, where it is received by port 571.

With reference now to step 640, MAC learning is disabled for the input port of the monitoring VLAN. In some embodiments, MAC learning may be selectively disabled. For example, if only specific types of traffic are of interest to every monitoring port in the monitoring VLAN, it may be desirable to route most of the traffic to a single monitoring port, while flooding the traffic across the entire monitoring VLAN if it meets certain specified criteria. Such criteria might include a particular VLAN identifier, or traffic that corresponds to a specific protocol, or a particular sender, receiver, or combination of those. In another embodiment, other criteria may be utilized for determining whether to disable MAC learning. Also, by only selectively disabling MAC learning, the input port of the monitoring VLAN may be used for other non-monitoring functions.

In different embodiments, MAC learning may be disabled by different approaches. For example, in one embodiment, a specific memory location, e.g., in storage 530, needs be modified to specifically disable MAC learning, by modifying a register value associated with that port. In another embodiment, e.g., where OS 525 supports a commandline interface (CLI) command to disable MAC learning, configuration 535 may include an appropriate CLI command to (selectively) disable MAC learning for the specified port.

Continuing the preceding example, MAC learning is disabled for port 571.

With reference now to step 645, in some embodiments, additional networking rules and/or techniques may be applied to the duplicated traffic. In some embodiments, some or all of the normal techniques and approaches available in manipulating network traffic flow can be utilized, in conjunction with this approach to network monitoring. For example, in one approach, an access control list (ACL) can be utilized to further subdivide the monitoring VLAN. Such an approach would be useful in order to, for example, route all voice over IP (VOIP) traffic to several of the ports in the monitoring VLAN, while not flooding all of the monitoring ports. Utilization of these network rules and techniques allows for finer grained control over traffic duplication and network monitoring.

With reference now to step 650, the receiving VLAN port forwards a copy of the duplicate traffic to all available ports in the monitoring VLAN. By disabling MAC learning, the input port for the monitoring VLAN is forced to use VLAN flooding, regardless of the specified destination for the duplicate traffic. In this way, an arbitrary number of copies of network traffic can be created, for use network monitoring. Simply by adding or removing ports in the VLAN, additional or fewer copies of traffic are automatically generated. In some embodiments, as previously noted, which ports are available in the monitoring VLAN may be modified, e.g., by application of additional network rules or techniques.

With reference to the preceding example, port 571 floods VLAN 570 with additional copies of duplicate 511, as indicated by arrow 531. For every other port in VLAN 570, a different copy is generated. By adding additional ports to VLAN 570, e.g., by adding port 574, an additional copy of the duplicate traffic would be automatically generated and forwarded to that port.

With reference now to step 660, a copy of the network traffic is output by each available port in the monitoring VLAN. By connecting monitoring devices to the various ports in the monitoring VLAN, copies of the network traffic of interest are forwarded to the monitoring devices. As such, the above described method allows for a single network device to generate an arbitrary number of copies of network traffic, and forward those copies to various arbitrary ports in a defined VLAN.

Creating Copies of Network Traffic

Figure 7:
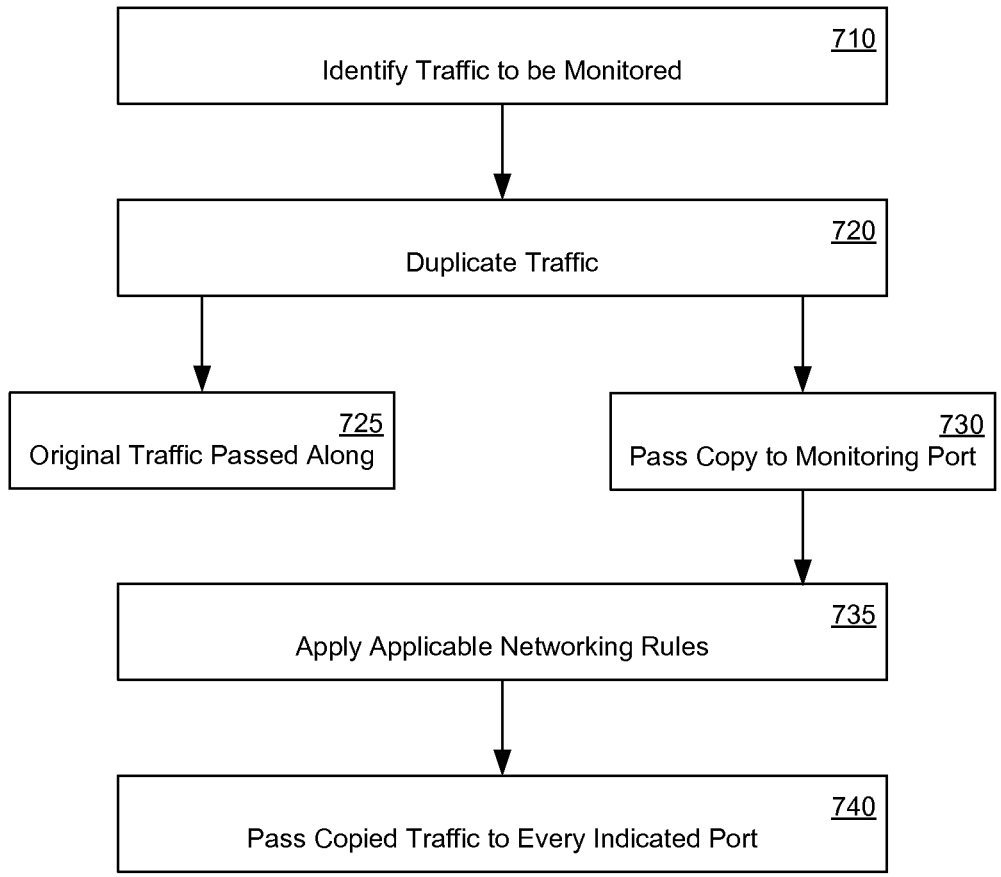
FIG. 7 is a flowchart of a method of creating copies of network traffic, in accordance with one embodiment.

With reference now to FIG. 7, a flowchart 700 of a method of creating copies of network traffic is depicted, in accordance with one embodiment. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

With reference to step 710, in some embodiments, network traffic of interest is identified. In different embodiments, different approaches may be utilized to flag specific network traffic as of interest. For example, in one embodiment, all network traffic may be so identified. In another embodiment, the originating source of the network traffic, or the intended destination, or the combination of those elements may be sufficient to identify network traffic as interesting. In another embodiment, the specific protocol being utilized by the network traffic, or the contents of that traffic may determine whether network traffic is of interest.

With reference now to step 720, the identified network traffic is duplicated. In some embodiments, a copy of the network traffic is created, e.g., using port mirroring. In another embodiment, other approaches may be utilized to create a copy of the network traffic, e.g., by using a physical tap to divert a portion of the signal.

With reference to step 725, the network traffic is passed along unhindered. In some embodiments, e.g., an embodiment where port mirroring is utilized, the original network traffic is allowed to pass through the network device, and is forwarded to its intended destination.

With reference to step 730, a copy of the network traffic is passed to a monitoring port. For example, the duplicate copy of the network traffic may be directed to a specific port in a layer 2 device, e.g., a monitoring port included in a VLAN.

With reference to step 735, any applicable networking rules are applied. For example, if certain networking rules are defined to apply to traffic passing through the monitoring port, e.g., an access control list, such networking rules may influence how the copy of the network traffic is handled, or the destination or destinations to which it is eventually routed.

With reference to step 740, the monitor port transmits the copy of the network traffic to each of a plurality of indicated ports. In different embodiments, different approaches are utilized in implementing this step. For example, in one embodiment, every indicated port is part of the same VLAN as the monitoring port. By disabling MAC learning for the monitoring port, the monitoring port can be compelled to flood the VLAN with copies of the network traffic.

Transparent VLAN Flooding

In different embodiments, approaches similar to that described above can be applied to different applications. Across different applications, the source of the network traffic to be flooded across a VLAN may differ: for example, in one embodiment, port mirroring may be used to duplicate network traffic, while in another embodiment, network traffic may be initially received into the monitoring VLAN, and one or more of the copies created through VLAN flooding is routed to its intended destination.

Figure 8:
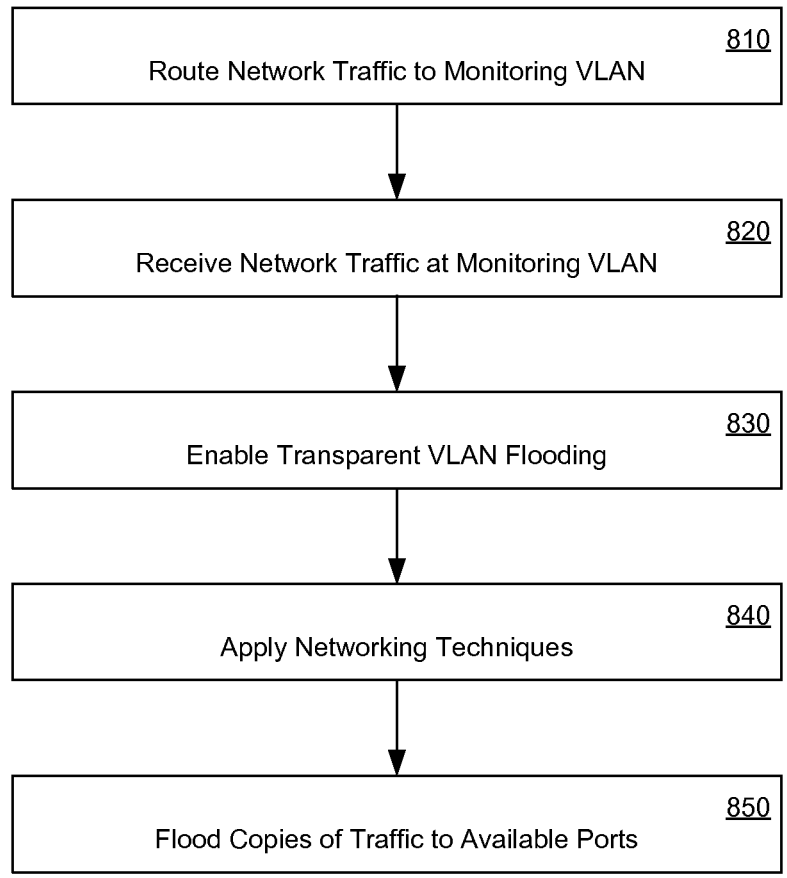
FIG. 8 is a flowchart of a method of transparent VLAN flooding, in accordance with one embodiment.

With reference now to FIG. 8, a flowchart 800 of a method of transparent VLAN flooding is depicted, in accordance with one embodiment. Although specific steps are disclosed in flowchart 800, such steps are exemplary. That is, embodiments of the present invention are well suited to performing various other (additional) steps or variations of the steps recited in flowchart 800. It is appreciated that the steps in flowchart 800 may be performed in an order different than presented, and that not all of the steps in flowchart 800 may be performed.

In step 810, network traffic is routed to a monitoring VLAN. As noted above, the source of network traffic may vary, across different embodiments. Several such embodiments are depicted below, with reference to FIGS. 9B, 10B, and 11B. Similarly, in different embodiments, the network traffic routed to the monitoring VLAN may be original, or a duplicate.

In step 820, the network traffic is received at the monitoring VLAN. In some embodiments, a particular port in a monitoring VLAN serves as an input port, and traffic routed to the monitoring VLAN is received into this input port.

In step 830, transparent VLAN flooding is enabled. Transparent VLAN flooding is used to create duplicate copies of received network traffic, and flood them across the monitoring VLAN. In some embodiments, transparent VLAN flooding is implemented by disabling MAC address learning for the input port for the monitoring VLAN.

With reference now to step 840, in some embodiments, additional networking techniques are applied. For example, in some embodiments, access control lists (ACLs) may be utilized, to restrict where duplicate copies of the received network traffic are routed, within the monitoring VLAN.

With reference now to step 850, copies of the received traffic are flooded to the available ports within the monitoring VLAN. For example, in an embodiment where transparent VLAN flooding is implemented through disabling MAC address learning, and an ACL is used to limit which ports receive copies of traffic, those ports in the monitoring VLAN which are not blocked by the ACL will receive a copy of the network traffic.

Transparent VLAN Flooding and Port Mirroring

As discussed above, in different embodiments, different approaches are utilized for routing network traffic to a monitoring VLAN, for use with transparent VLAN flooding. One such approach involves port mirroring as a source for duplicate network traffic.

Figure 9A:
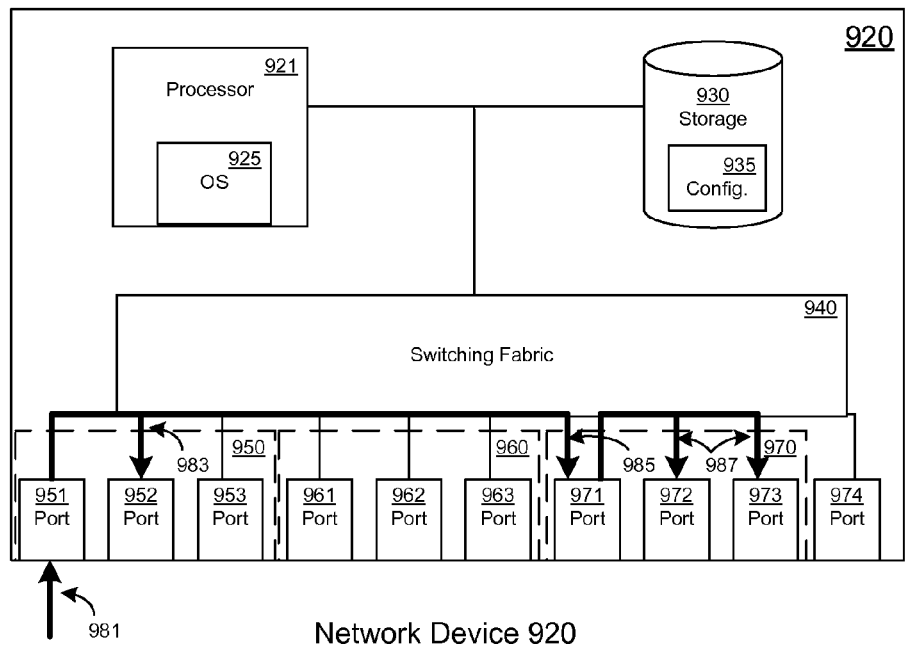
FIG. 9A is a depiction of the flow of network traffic through an exemplary network device, in accordance with one embodiment.

With reference now to FIG. 9A, the flow of network traffic through a network device 920 is depicted, in accordance with one embodiment. While network device 920 is shown as incorporating specific, enumerated features, it is understood that embodiments are well suited to applications involving additional, fewer, or different features or arrangements. Moreover, while network device 920, as shown, is a layer 2 device, it is understood that embodiments may be practiced on many different types of devices, e.g., a layer 2/3 device.

As shown, network device 920 includes processor 921, storage 930, switching fabric 540, and a number of communications ports, e.g., ports 951, 952, 953, 961, 962, 963, 971, 972, 973, and 974. An operating system 925 is shown as executing on processor 921. A configuration 935 is shown as being stored within storage 930.

Figure 9B:
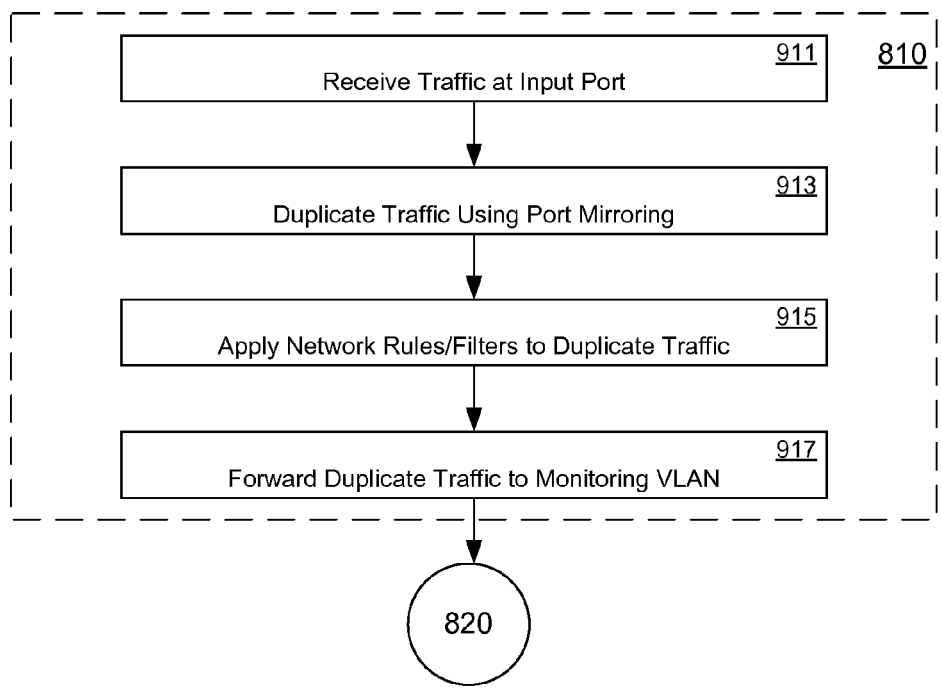
FIG. 9B is a flowchart of a method of utilizing transparent VLAN flooding in conjunction with port mirroring, in accordance with one embodiment.

With reference now to FIG. 9B, a flowchart 900 of a method of utilizing transparent VLAN flooding in conjunction with port mirroring is depicted, in accordance with one embodiment. Although specific steps are disclosed in flowchart 900, such steps are exemplary. That is, embodiments of the present invention are well suited to performing various other (additional) steps or variations of the steps recited in flowchart 900. It is appreciated that the steps in flowchart 900 may be performed in an order different than presented, and that not all of the steps in flowchart 900 may be performed.

In one embodiment, the method of flowchart 900 is intended to replace step 810 in flowchart 800, e.g., such that the method of flowchart 900 serves to generate and route network traffic to monitoring VLAN.

With reference to step 911, network traffic is received at an input port in a network device. In the depicted embodiment, the network traffic is intended for a destination indicated by information contained in the network traffic. For example, with reference to FIG. 9A, network traffic 981 is received into network device 920 at port 951.

With reference to step 913, a duplicate copy of the received traffic is created. In some embodiments, network traffic is created using a port mirroring technique, such as that described previously. The original traffic is then passed through the network device to its intended destination. For example, the received network traffic is routed through network device 920, as indicated by arrow 983.

With reference to step 915, in some embodiments, network rules or filters can be applied to the duplicate traffic. For example, the duplicate traffic can be subjected to an access control list, so as to determine where to route the duplicate copy.

With reference to step 917, the duplicate traffic is forwarded to the monitoring VLAN. For example, the duplicate traffic is passed from port 951 to monitoring VLAN input port 971, as indicated by arrow 985.

The method of flowchart 900, as shown, serves as a replacement for step 810 of flowchart 800. As such, the method of flowchart 900 is intended to flow into step 820, where the network traffic is received by the monitoring VLAN, and eventually copies of the traffic are flooded to all available ports within the monitoring VLAN. For example, copies of the network traffic are passed to the other ports within monitoring VLAN 970, as indicated by arrows 987.

Transparent VLAN Flooding and In-Line Taps

As discussed previously, one approach for creating a duplicate copy of network traffic involves inserting an in-line tap into a network line. Transparent VLAN flooding can be used in conjunction with such an in-line tap, in order to create numerous duplicate copies from a single copy, without further reducing signal strength in the network line.

Figure 10A:
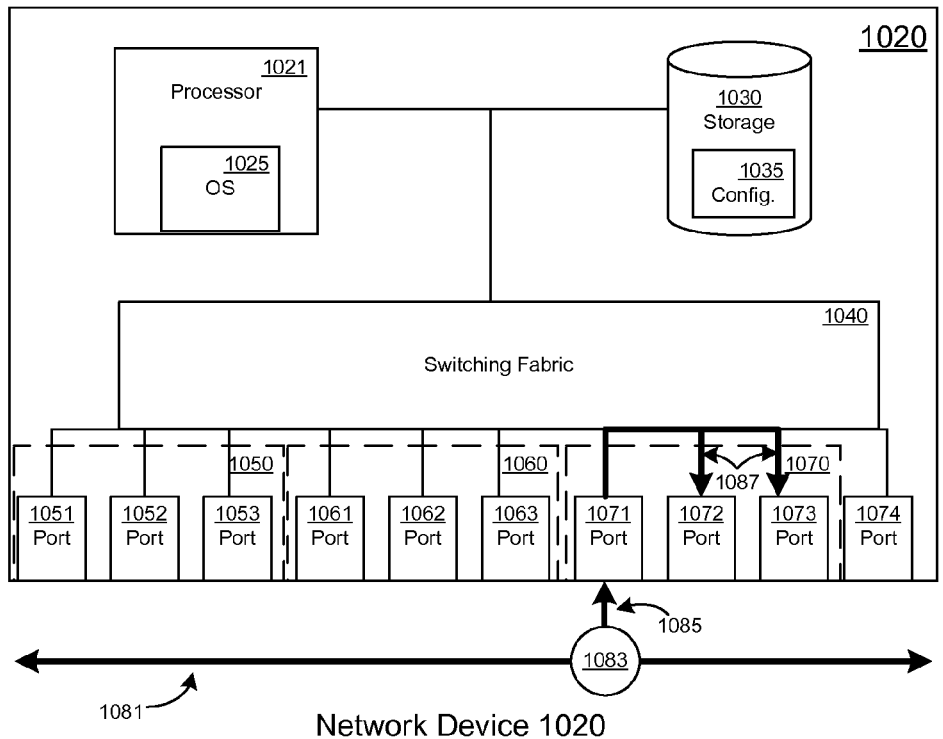
FIG. 10A is a depiction of the flow of network traffic through an exemplary network device, in accordance with one embodiment.

With reference now to FIG. 10A, the flow of network traffic through a network device 1020 is depicted, in accordance with one embodiment. While network device 1020 is shown as incorporating specific, enumerated features, it is understood that embodiments are well suited to applications involving additional, fewer, or different features or arrangements. Moreover, while network device 1020, as shown, is a layer 2 device, it is understood that embodiments may be practiced on many different types of devices, e.g., a layer 2/3 device.

As shown, network device 1020 includes processor 1021, storage 1030, switching fabric 540, and a number of communications ports, e.g., ports 1051, 1052, 1053, 1061, 1062, 1063, 1071, 1072, 1073, and 1074. An operating system 1025 is shown as executing on processor 1021. A configuration 1035 is shown as being stored within storage 1030.

Figure 10B:
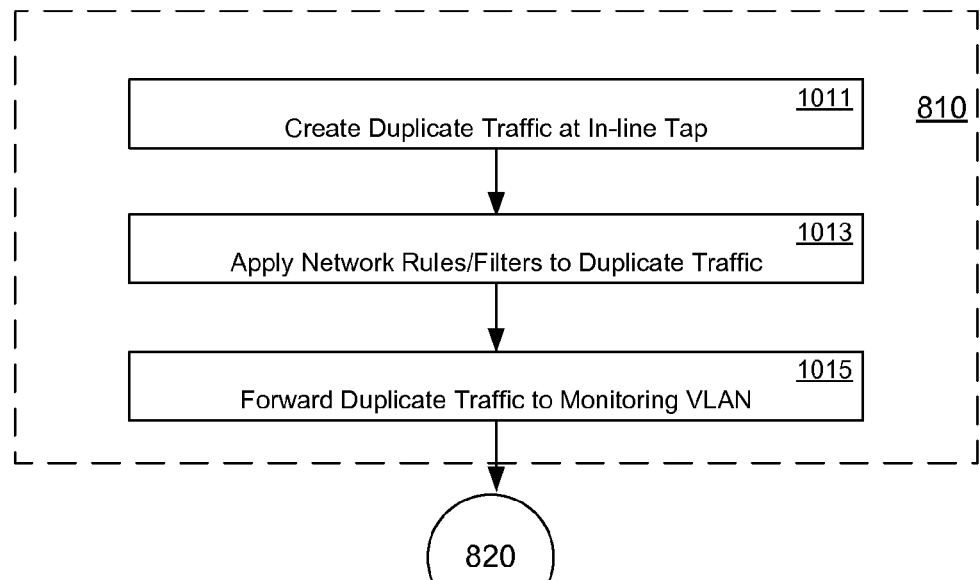
FIG. 10B is a flowchart of a method of utilizing transparent VLAN flooding in conjunction with an in-line tap, in accordance with one embodiment.

With reference now to FIG. 10B, a flowchart 1000 of a method of utilizing transparent VLAN flooding in conjunction with an in-line tap is depicted, in accordance with one embodiment. Although specific steps are disclosed in flowchart 1000, such steps are exemplary. That is, embodiments of the present invention are well suited to performing various other (additional) steps or variations of the steps recited in flowchart 1000. It is appreciated that the steps in flowchart 1000 may be performed in an order different than presented, and that not all of the steps in flowchart 1000 may be performed.

With reference now to step 1011, a duplicate copy of network traffic is created by an in-line tap. In different embodiments, different in-line taps may be utilized. For instance, in one embodiment, a fiber-optic cable carrying a network signal is tapped, such that a portion of the light contained therein is diverted.

For example, with reference to FIG. 10A, network traffic 1081 is intercepted by in-line tap 1083. A portion of the signal making up network traffic 1081 is diverted, and a somewhat diminished signal continues to the intended destination, as indicated by arrow 1082.

With reference now to step 1013, in some embodiments, network rules or filters can be applied to the duplicate traffic. For example, the duplicate traffic can be subjected to an access control list, so as to determine where to route the duplicate copy. These embodiments allow for selectively routing duplicate traffic, e.g., to route different types of duplicate traffic to different destinations.

With reference now to step 1015, the duplicate copy of the network traffic is forwarded to the monitoring VLAN. In some embodiments, the diverted signal is passed to a network device which implements transparent VLAN flooding, in order to generate multiple copies of the network traffic. For example, as indicated by arrow 1085, the diverted portion of the signal for traffic 1081 is passed to network device 1020, and specifically to monitoring VLAN input port 1071.

The method of flowchart 1000, as shown, serves as a replacement for step 810 of flowchart 800. As such, the method of flowchart 1000 is intended to flow into step 820, where the network traffic is received by the monitoring VLAN, and eventually copies of the traffic are flooded to all available ports within the monitoring VLAN. For example, copies of the network traffic are passed to the other ports within monitoring VLAN 1070, as indicated by arrows 1087.

Transparent VLAN Flooding and Network Traffic Sources

Transparent VLAN flooding can also be used in scenarios where the original network traffic is passed to a monitoring VLAN, rather than diverting a copy of the traffic to the VLAN. For example, a traffic source, such as a computer, may direct traffic directly to the monitoring VLAN, in order to generate numerous copies of the traffic.

Figure 11A:
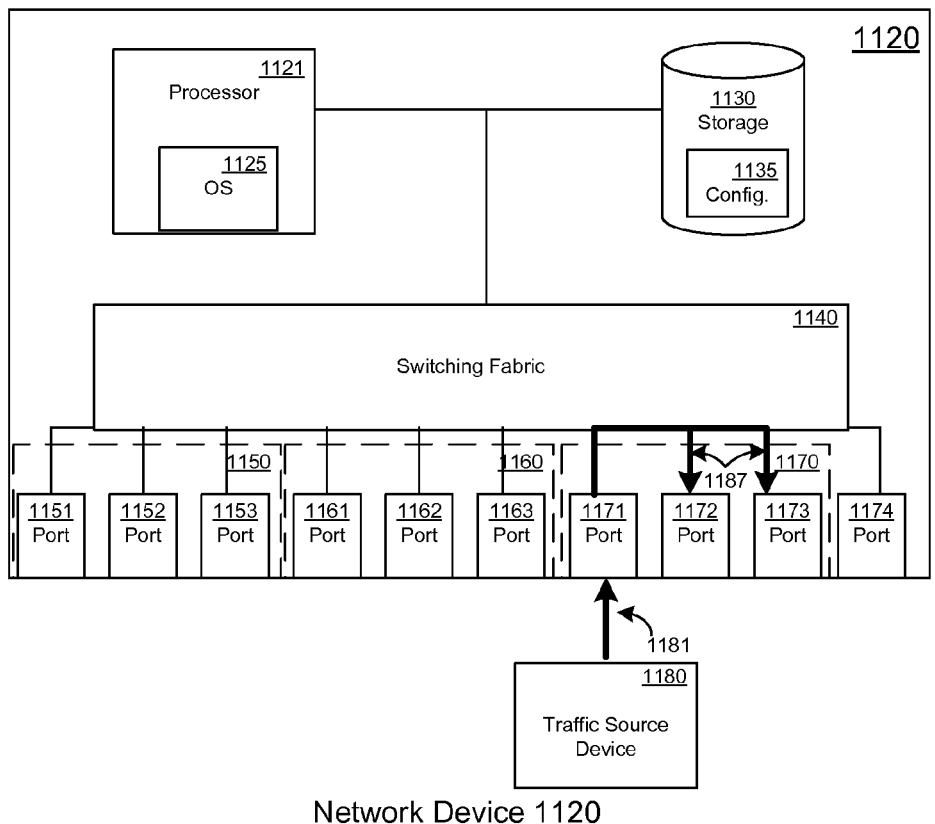
FIG. 11A is a depiction of the flow of network traffic through an exemplary network device, in accordance with one embodiment.

With reference now to FIG. 11A, the flow of network traffic through a network device 1120 is depicted, in accordance with one embodiment. While network device 1120 is shown as incorporating specific, enumerated features, it is understood that embodiments are well suited to applications involving additional, fewer, or different features or arrangements. Moreover, while network device 1120, as shown, is a layer 2 device, it is understood that embodiments may be practiced on many different types of devices, e.g., a layer 2/3 device.

As shown, network device 1120 includes processor 1121, storage 1130, switching fabric 540, and a number of communications ports, e.g., ports 1151, 1152, 1153, 1161, 1162, 1163, 1171, 1172, 1173, and 1174. An operating system 1125 is shown as executing on processor 1121. A configuration 1135 is shown as being stored within storage 1130.

Figure 11B:
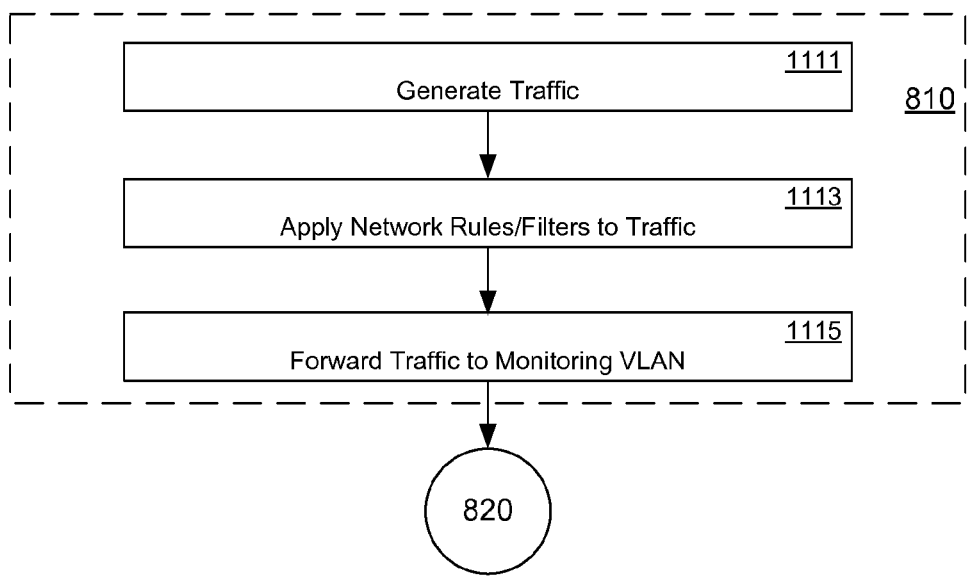
FIG. 11B is a flowchart of a method of utilizing transparent VLAN flooding in conjunction with a network traffic source, in accordance with one embodiment.

With reference now to FIG. 11B, a flowchart 1100 of a method of utilizing transparent VLAN flooding in conjunction with a network traffic source is depicted, in accordance with one embodiment. Although specific steps are disclosed in flowchart 1100, such steps are exemplary. That is, embodiments of the present invention are well suited to performing various other (additional) steps or variations of the steps recited in flowchart 1100. It is appreciated that the steps in flowchart 1100 may be performed in an order different than presented, and that not all of the steps in flowchart 1100 may be performed.

With reference to step 1111, a network traffic source generates network traffic. In different embodiments, different types of network traffic sources may generate different types of network traffic.

With reference to step 1113, in some embodiments, network rules or filters can be applied to the traffic. For example, the traffic can be subjected to an access control list, so as to determine where to route the duplicate copy. Such embodiments allow traffic to be further manipulated, prior to passing it to the monitoring VLAN. For example, different types of traffic may be routed to different input ports, or different VLANs.

With reference now to step 1115, the network traffic is forwarded to a monitoring VLAN. For example, with reference to FIG. 11A, traffic source device 1180 generates network traffic 1181, and forwards it to network device 1120, specifically to monitoring VLAN input port 1171.

The method of flowchart 1100, as shown, serves as a replacement for step 810 of flowchart 800. As such, the method of flowchart 1100 is intended to flow into step 820, where the network traffic is received by the monitoring VLAN, and eventually copies of the traffic are flooded to all available ports within the monitoring VLAN. For example, copies of the network traffic are passed to the other ports within monitoring VLAN 1170, as indicated by arrows 1187.

Further, in some embodiments, such as the method described by flowchart 1100, a copy of the network traffic may be passed to any desired destination. For example, one port within the monitoring VLAN may be configured to route a copy of the network traffic outside the monitoring VLAN, e.g., to another VLAN, to a specified MAC address, to a specified IP address, or to any other recognized network destination. In this way, copies of the network traffic may be passed to several different VLANs, perhaps to be further duplicated by another monitoring VLAN.

Embodiments of the present invention are thus described. While the present invention has been described in particular embodiments, it should be appreciated that the present invention should not be construed as limited by such embodiments, but rather construed according to the following claims.

What is claimed is:

1. A method comprising:
   determining, based on contents of a packet received at a network device, that the received packet is to be sent to one or more monitoring devices, wherein the network device includes a virtual local area network (VLAN), the VLAN including a receiving port and a plurality of I/O ports, the receiving port and the plurality of I/O ports of the VLAN corresponding to ports of the network device, wherein Media Access Control (MAC) learning has been disabled for the receiving port;
   generating a duplicate packet from the received packet;
   causing the duplicate packet to be sent to the receiving port of the VLAN; and
   upon receiving the duplicate packet at the receiving port of the VLAN, causing a copy of the duplicate packet to be sent to each of one or more of the plurality of I/O ports of the VLAN.

2. The method of claim 1, wherein determining that the packet is to be sent to one or more monitoring devices includes determining that information included in the packet matches a defined parameter.

3. The method of claim 1, wherein determining that the packet is to be sent to one or more monitoring devices includes determining that information included in the packet matches a specified networking protocol.

4. The method of claim 1, wherein determining that the packet is to be sent to one or more monitoring devices includes determining that information included in the packet matches a specified recipient network address.

5. The method of claim 1, wherein determining that the packet is to be sent to one or more monitoring devices includes determining that information included in the packet matches a specified sender network address.

6. The method of claim 1, further comprising using an access control list (ACL) to determine to which of the plurality of I/O ports the duplicate packet is copied.

7. The method of claim 6, further comprising:
   identifying a type of the packet;
   wherein causing a copy of the duplicate packet to be sent to each of one or more of the plurality of I/O ports includes selecting one or more ports from the plurality of I/O ports using the ACL.

8. The method of claim 6, wherein causing a copy of the duplicate packet to be sent to each of one or more of the plurality of I/O ports includes selecting one or more ports from the plurality of I/O ports, wherein the one or more selected ports are determined from the ACL to be ports associated with devices for analyzing network traffic.

9. The method of claim 1, wherein generating the duplicate packet includes using port mirroring to duplicate the packet.

10. The method of claim 1, wherein each of the plurality of I/O ports is configured to connect to a corresponding monitoring device.

11. The method of claim 1, wherein causing a copy of the duplicate packet to be sent to each of one or more of the plurality of I/O ports includes causing a copy of the duplicate packet to be sent to each of the plurality of I/O ports.

12. A non-transitory computer-readable medium storing a plurality of instructions executable by one or more processors of a network device, the network device including a virtual local area network (VLAN), the VLAN including a receiving port and a plurality of I/O ports, the receiving port and the plurality of I/O ports of the VLAN corresponding to ports of the network device, wherein Media Access Control (MAC) learning has been disabled for the receiving port; and
   wherein the plurality of instructions comprise:
      instructions for causing at least one processor from the one or more processors to determine, based on contents of a packet received at the network device, that the received packet is to be sent to one or more monitoring devices;
      instructions for causing at least one processor from the one or more processors to generate a duplicate packet from the received packet; and instructions for causing at least one processor from the one or more processors to cause the duplicate packet to be sent to the receiving port of the VLAN of the network device; and upon receiving the duplicate packet at the receiving port of the VLAN:

instructions for causing at least one processor from the one or more processors to cause a copy of the duplicate packet to be sent to each of one or more of the plurality of I/O ports of the VLAN.

13. The non-transitory computer-readable medium of claim 12, wherein the instructions for causing at least one processor from the one or more processors to generate the duplicate packets include instructions for causing at least one processor from the one or more processors to use port mirroring for generating the duplicate packet.

14. The non-transitory computer-readable medium of claim 12, wherein each of the plurality of I/O ports is configured to connect to a monitoring device.

15. The non-transitory computer-readable medium of claim 12, wherein the instructions for causing at least one processor from the one or more processors to cause a copy of the duplicate packet to be sent to one or more of the plurality of I/O ports include instructions for causing at least one processor from the one or more processors to send a copy to each of the plurality of I/O ports.

16. The non-transitory computer-readable medium of claim 12, wherein instructions for causing at least one processor from the one or more processors to determine that the packet is to be sent to one or more monitoring devices include instructions for causing at least one processor from the one or more processors to determine that information included in the packet matches a defined parameter.

17. A network device, comprising:

a plurality of ports, comprising a first port configured as a receiving port for a VLAN configured for the network device, the plurality of ports further comprising a set of ports configured as I/O ports of the VLAN, wherein Media Access Control (MAC) learning has been disabled for the receiving port;

wherein the network device is configured to:

determine, based on contents of a packet received at the network device, that the received packet is to be sent to one or more monitoring devices;

generate a duplicate packet from the received packet;

cause the duplicate packet to be sent to the receiving port of the VLAN of the network device; and upon receiving the duplicate packet at the receiving port of the VLAN, cause a copy of the duplicate packet to be sent to each of one or more of the I/O ports of the VLAN.

18. The network device of claim 17, wherein the network device is configured to determine that the packet is to be sent to one or more monitoring devices by determining that information included in the packet matches a defined parameter.

19. The network device of claim 17, wherein the network device is configured to determine that the packet is to be sent to one or more monitoring devices by determining that information included in the packet matches a specified networking protocol.

20. The network device of claim 17, wherein the network device is configured to determine that the packet is to be sent to one or more monitoring devices includes determining that information included in the packet matches a specified recipient network address.

21. The network device of claim 17, wherein the network device is configured to determine that the packet is to be sent to one or more monitoring devices by determining that information included in the packet matches a specified sender network address.

22. The network device of claim 17, wherein the network device is further configured to use an access control list (ACL) to determine to which of the I/O ports the duplicate packet is copied.

23. The network device of claim 22, wherein the network device is further configured to:

identify a type of the duplicate packet; and select one or more ports from the plurality of I/O ports to which copies of the duplicate packet arc sent using the ACL.

24. The network device of claim 22, wherein the network device is configured to cause a copy of the duplicate packet to be sent to each of the plurality of I/O ports by selecting one or more ports from the plurality of I/O ports, wherein the one or more selected ports are determined from the ACL to be ports associated with devices for analyzing network traffic.

25. The network device of claim 17, wherein the network device is configured to generate the duplicate packet using port mirroring.

26. The network device of claim 25, wherein the network device is configured to generate the duplicate packet using port mirroring.

27. The network device of claim 17, wherein each of the plurality of I/O ports is configured to connect to a corresponding monitoring device.

28. The network device of claim 17, wherein the network device is configured to cause a copy of the duplicate packet to be sent to each of the plurality of I/O ports.

\* \* \* \* \*